(12) United States Patent
Shido

(10) Patent No.: US 7,605,797 B2
(45) Date of Patent: Oct. 20, 2009

(54) PARTICLE MOVEMENT-TYPE DISPLAY APPARATUS AND DRIVING METHOD THEREOF

(75) Inventor: Shunichi Shido, Zama (JP)

(73) Assignee: Canon Kabushiki Kaisha, Tokyo (JP)

(*) Notice: Subject to any disclaimer, the term of this patent is extended or adjusted under 35 U.S.C. 154(b) by 49 days.

(21) Appl. No.: 10/556,325

(22) PCT Filed: Jun. 8, 2005

(86) PCT No.: PCT/JP2005/010902

§ 371 (c)(1),
(2), (4) Date: Apr. 20, 2007

(87) PCT Pub. No.: WO2005/121887

PCT Pub. Date: Dec. 22, 2005

(65) Prior Publication Data

US 2008/0024425 A1 Jan. 31, 2008

(30) Foreign Application Priority Data

Jun. 8, 2004 (JP) .............................. 2004-170509

(51) Int. Cl.
*G09G 3/34* (2006.01)
(52) U.S. Cl. ...................................... 345/107; 359/296
(58) Field of Classification Search .................. 345/107; 359/296

See application file for complete search history.

(56) References Cited

U.S. PATENT DOCUMENTS

2001/0030639 A1* 10/2001 Goden ........................ 345/107

FOREIGN PATENT DOCUMENTS

| JP | 2003-195363 | 7/2003 |
|---|---|---|
| JP | 2003-255402 | 9/2003 |
| JP | 2003-330048 | 11/2003 |
| JP | 2004-184945 | 7/2004 |
| JP | 2004-294718 | 10/2004 |

OTHER PUBLICATIONS

International Search Report dated Aug. 2, 2005.

* cited by examiner

*Primary Examiner*—Alexander Eisen
*Assistant Examiner*—Kenneth B Lee, Jr.
(74) *Attorney, Agent, or Firm*—Fitzpatrick, Cella, Harper & Scinto

(57) ABSTRACT

In order to permit stable gradation display or high-speed display, when predetermined voltages are applied to a collection electrode 1 and a display electrode 2, respectively, to move particles between the collection electrode 1 and the display electrode 2, a voltage is applied to a pressing electrode 4 to press the particles against the display electrode 2 so that they are stabilized on the display electrode 2 with a uniform spacing therebetween.

7 Claims, 10 Drawing Sheets

(a)

(b)

(a)

(b)

(c)

PARTICLE MOVEMENT-TYPE DISPLAY APPARATUS AND DRIVING METHOD THEREOF

TECHNICAL FIELD

The present invention relates to a particle movement-type display apparatus and a driving method thereof.

BACKGROUND ART

In recent years, development of rewritable recording medium (which is capable of being subjected to a number of times of recording/erasing cycle of highly visible image and does not require energy for maintaining a display state) has been advanced actively. Herein, such a rewritable display means that it inherits a characteristic of hard copy is referred to as "paper-like display".

Necessary conditions of paper-like display are such that it is rewritable, requires no or less energy for maintaining a display state (memory characteristic), and is excellent in portability and display quality, and the like.

As a display method capable of being utilized for the paper-like display, there are those using particle movement-type display apparatuses. As one example of Harold D. Lees et al. (U.S. Pat. No. 3,612,758) or an electrophoretic display apparatus described in Japanese Laid-Open Patent Application (JP-A) No. 2003-195363 has been known.

The conventional electrophoretic display apparatus comprises a dispersion system, comprising an insulating liquid and colored electrophoretic particles dispersed in the insulating liquid, and a pair of electrodes disposed opposite to each other with the dispersion system therebetween. By applying a voltage to the dispersion system through the electrodes, the colored electrophoretic particles are adsorbed on the electrode of a polarity opposite to that of electric charges of the colored electrophoretic particles through Coulomb force utilizing an electrophoretic characteristic of the colored electrophoretic particles. Display is effected by utilizing a difference in color between the colored electrophoretic particles and a dyed insulating liquid. More specifically, in the case where the electrophoretic particles are adsorbed on the surface of a light-transmissive first electrode close to an observer, the color of the electrophoretic particles is observed and on the other hand, in the case where the electrophoretic particles are adsorbed on the surface of a second electrode distant from the observer, the color of the insulating liquid dyed so as to be different in optical characteristic from the electrophoretic particles is observed.

However, in such an electrophoretic display apparatus (hereinafter, referred to as a "vertical movement-type electrophoretic display apparatus), a color former such as a dye or ion has to be mixed in the insulating liquid but the presence thereof is liable to act as an unstable factor in an electrophoretic operation since the color former causes new giving and receiving of electric charges. For this reason, the use of the color former has lowered the performance, the life, and stability of the display apparatus in some cases.

In order to solve such problems, a horizontal movement-type display apparatus in which a pair of first and second electrodes are disposed on the same substrate and colored electrophoretic particles are moved horizontally when viewed from the observer has been proposed. In the display apparatus, by utilizing the electrophoretic characteristic, a voltage is applied to the colored electrophoretic particles are moved in parallel to the substrate surface between the first electrode surface and the second electrode surface (JP-A Nos. Hei 9-211499, 2001-249366, 2002-162650, and 2003-270674, and U.S. Patent Application Publication No. US2001/0030 639A1).

In the horizontal movement-type electrophoretic display apparatus, the insulating liquid is transparent in many cases and when viewed from the observer, the first electrode and the second electrode assume different colors one of which is identical to the color of the electrophoretic particle. For example, when the color of the first electrode is black, the color of the second electrode is white, and the color of the electrophoretic particles is black, in the case where the electrophoretic particles are distributed on the first electrode, the second electrode is exposed to assume white and in the case where the electrophoretic particles are distributed on the second electrode, the color of the electrophoretic particles, i.e., black is displayed.

However, in the conventional horizontal movement-type electrophoretic display apparatus, the electrophoretic particles are required to be moved from one electrode to the other electrode thereby to cover the other electrode surface, so that a movement distance is generally longer than that in the vertical movement-type electrophoretic display apparatus. For this reason, the horizontal movement-type electrophoretic display apparatus takes a long time from start of drive to stabilization in gradation display.

In addition, in the case where the first electrode and the second electrode are disposed on the same substrate as described above, there arises a difference in local electric field in ambient space, so that a difference in movement of the electrophoretic particles is caused to occur depending on place. More specifically, in the case where an amount of charge of the electrophoretic particles is not changed, a quick migration portion by a strong electric field and a slow migration portion by a weak electric field are present. Particularly, a lowering in moving speed of the electrophoretic particles at the weak electric field portion causes a lowering in display speed and a lowering in gradation display stability.

DISCLOSURE OF THE INVENTION

An object of the present invention is to realize high-speed and stable display, particularly halftone display in a horizontal movement-type electrophoretic display apparatus.

A specific object of the present invention is to provide a particle movement-type display apparatus capable of effecting high-speed and stable (halftone) display.

Another object of the present invention is to provide a method of driving the particle movement-type display apparatus.

According to an aspect of the present invention, there is provided a particle movement-type display apparatus, comprising:

a plurality of pixels each comprising a first electrode, a planar second electrode, a planar third electrode, and a dispersion liquid for dispersing a plurality of particles which are moved to the first electrode or the planar second electrode to effect display, wherein the first electrode is disposed as a part of a partition wall for partitioning adjacent pixels, and the third electrode is disposed opposite to the second electrode through the dispersion liquid therebetween, and wherein when the particles are moved between the first electrode and the second electrode by applying predetermined voltages to the first electrode and the second electrode, respectively, a voltage for generating an electric field for pressing the particles against the second electrode is applied to the third electrode.

According to another aspect of the present invention, there is provided a method of driving a particle movement-type display apparatus, comprising:

a step of preparing a particle movement-type display apparatus including a plurality of pixels each comprising a first electrode, a planar second electrode, a planar third electrode, and a dispersion liquid for dispersing a plurality of particles, wherein the first electrode is disposed on a partition wall for partitioning adjacent pixels, the third electrode is disposed opposite to the second electrode through the dispersion liquid therebetween, and the particles are moved to the first electrode or the planar second electrode to effect predetermined display; and a movement step of moving the particles between the first electrode and the second electrode by applying predetermined voltages to the first electrode and the second electrode, respectively;

wherein the driving method further comprises, in the movement step, a step of applying a voltage, to the third electrode, for generating an electric field for pressing the particles against the second electrode.

When the particles are moved between the first and second electrodes by applying predetermined voltages to the first and second electrodes, respectively, a voltage is applied to the third electrode (pressing electrode) to move and press the particles against the second electrode, so that the particles are stabilized with a substantially uniform spacing therebetween on the second electrode. As a result, stable gradation display can be realized. Further, it is possible to remedy the problem of lowering in moving speed at the weak electric field portion, so that it becomes possible to effect display at higher speed them that in the case of omitting the pressing electrode (third electrode).

In a preferred embodiment, the driving method further includes a step of supplying, to either one of the first electrode and second electrode, a first signal for setting a gradation level at a portion on the second electrode most distant from the first electrode and then supplying a second signal for setting a gradation level at a portion in the neighborhood of the first electrode when the particles are moved between the first and second electrodes by applying predetermined voltages to the first and second electrodes, respectively, while applying a voltage to the third electrode.

According to this embodiment, a particle density in the neighborhood of the pixel is set by the first signal and the gradation level at a peripheral portion of the pixel is set by the second signal, so that it is possible to reduce a gradation display time compared with the case where the first and second signals are supplied.

Further, it is also preferable that the first signal is supplied as a signal for releasing (moving) a necessary number of particles for display of set gradation level and the second signal is supplied as a signal for displaying the set gradation level, thus moving the particles between the first and second electrodes to reduce the gradation display time similarly as in the above described embodiment.

Further, it is also preferable that the first signal is supplied as a signal for distributing (moving) the particles on or in the neighborhood of the first electrode toward the second electrode (display electrode) to change a particle distribution and the second signal is supplied as a signal for displaying the set gradation level, thus moving the particles between the first and second electrodes to reduce the gradation display time similarly as in the above described embodiment.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

Hereinbelow, embodiments of the present invention will be described with reference to the drawings.

Figure 1:
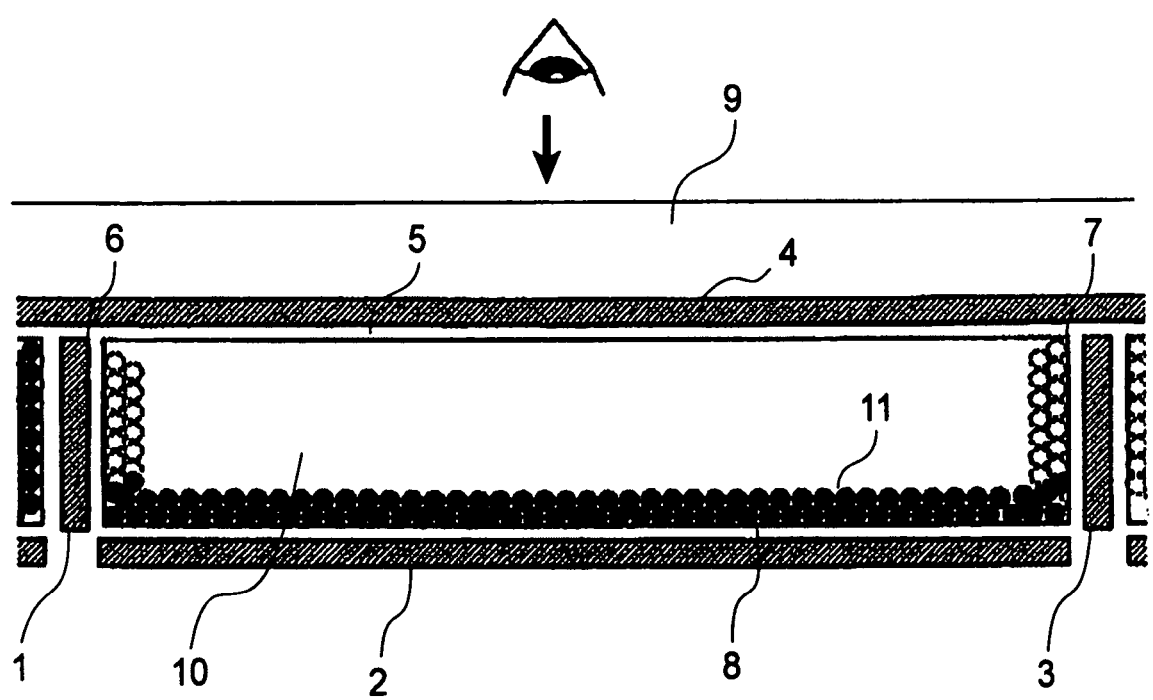
FIG. 1 is a sectional view of a pixel portion of horizontal movement-type electrophoretic display apparatus as an example of a particle movement-type display apparatus according to the present invention.

FIG. 1 is a sectional view showing a pixel portion of a horizontal movement-type electrophoretic display apparatus as an example of the particle movement-type display apparatus according to the present invention.

Each pixel includes collection electrodes 1 and 3 as a first electrode, a display electrode 2 as a second electrode, and a pressing electrode 4 as a third electrode. A function of the pressing electrode 4 will be described in detail later.

On the pressing electrode 4, a sealing layer 9 is laminated. As the sealing layer 9, a plastic film having a strength sufficient to seal the pixel (cell) is used. On the surfaces of the respective electrodes, insulating thin films 5-8 are disposed so as to prevent electrochemical change of the particles or liquid caused by a direct contact of the metal surface with the liquid under voltage application. By these insulating thin films, it is possible to limit a current. However, it is necessary to apply an electric field to the particles in the driving method of the present invention and passing of the current is not required, so that these insulating thin films do not adversely affect the drive of the display apparatus.

In an electrophoretic dispersion liquid 10 in which electrophoretic (migration) particles 11 are dispersed in a liquid, the electrophoretic particles 11 are moved between the collection electrodes 1 and 3 and the display electrode 2 by an electric field generated by a potential different between the collection electrodes and the display electrode. In FIG. 1, most of the electrophoretic particles 11 (hereinafter, simply referred to as "particles") are indicated as black particles but it is not necessary to use the black particles. In the present invention, it is possible to use particles 11 colored a necessary color for the display apparatus. In this embodiment, it is possible to effect display of white/black images by using a white display electrode 2 and covering the white display electrode 2 with black particles 11. In FIG. 1, the particles indicated by black circles (dots) are particles 11 moved onto the display electrode 2 and the particles indicated by white circles (dots) are particles 11 moved onto the collection electrodes 1 and 3.

FIG. 1 shows one pixel. In FIG. 1, a closed space is defined by the upper and lower electrodes (insulating films) and a partition wall as a vertically extended portion (indicated by reference numerals 1,3,6, and 7). The space constitutes each pixel.

The pressing electrode 4 used in the present invention will be described.

The particle movement-type display apparatus includes a transparent medium and displays a predetermined image by moving the colored particle but also effect display by the color of the display electrode 2 simultaneously with the display by the colored particles. More specifically, display is effected by utilizing such a phenomenon that a visible state is different depending on a proportion of the particles which cover the display electrode surface. Accordingly, a gradation accuracy of the display apparatus of this type is influenced by whether or not the proportion of the particles covering the display electrode surface can be controlled with a high accuracy.

Figure 2:
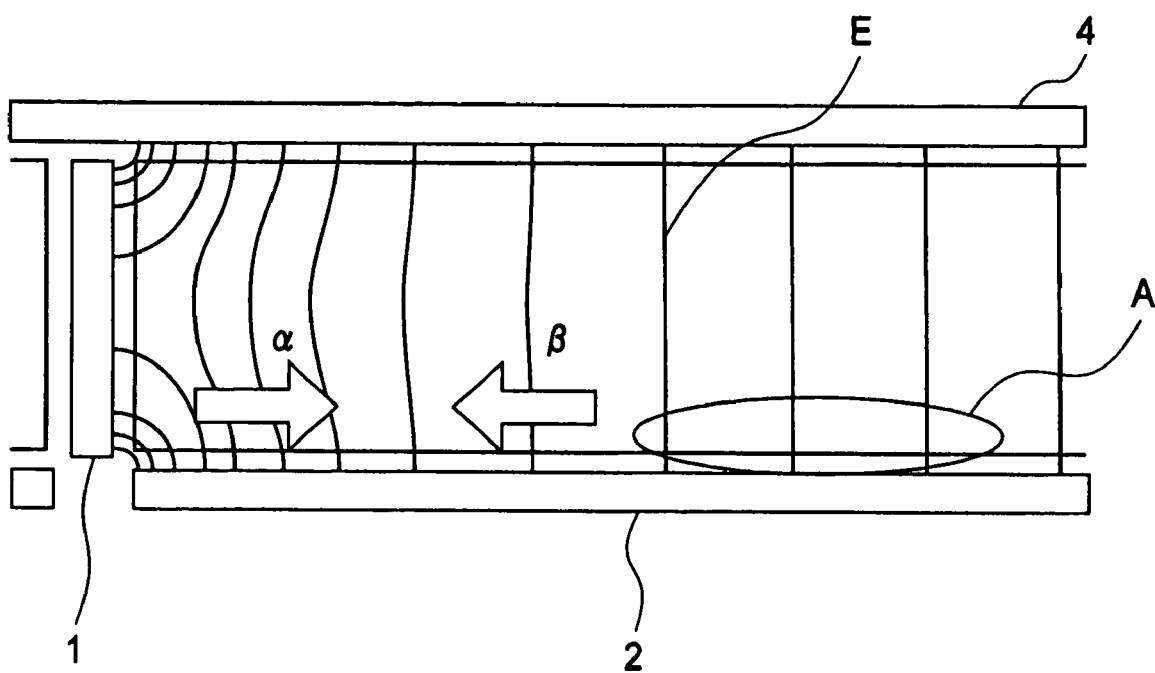
FIG. 2 is an electric field distribution view at pixel in the case where a pressing electrode is provided at the pixel in the horizontal movement-type display apparatus.

FIG. 2 shows an electric field distribution in the neighborhood of the collection electrode 1 at one pixel shown in FIG. 1. As shown in FIG. 2, an electric field E is distributed when a voltage is applied to the pressing electrode 4 with respect to the display electrode 2. In FIG. 2, the case where the collection electrode 1 has a potential is shown, so that the electric field distribution is somewhat changed by the potential and position of the collection electrode 1 but is roughly as shown in FIG. 2, thus being not so largely changed.

Figure 3:
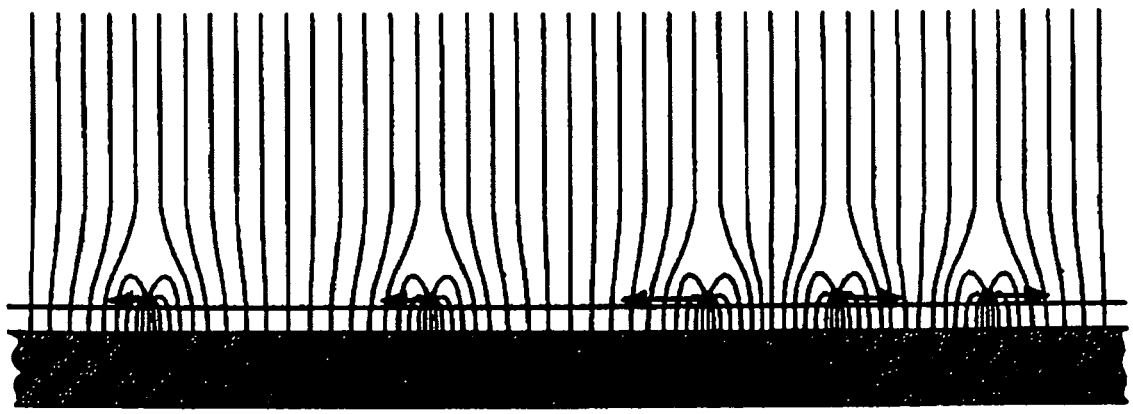
FIGS. 3(a) and 3(b) are views each for illustrating an electric field distribution on a display electrode.
Figure 3:
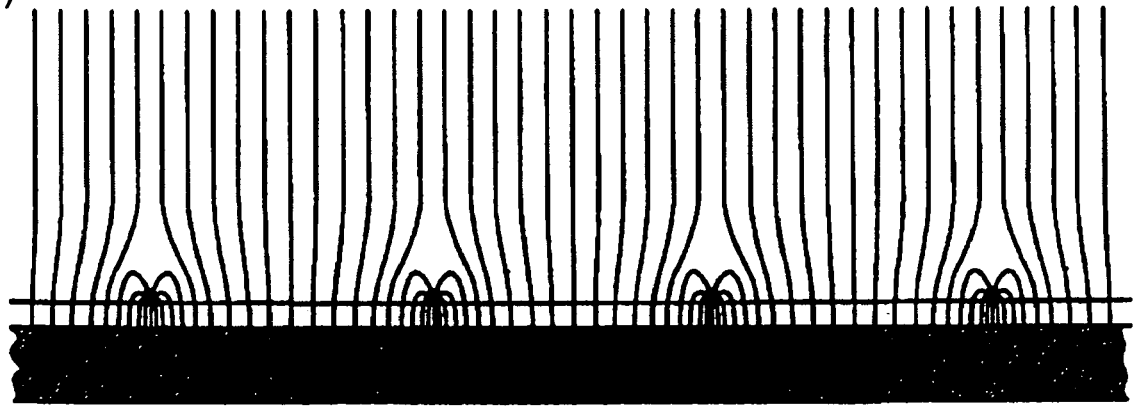

Here, an area A is considered. The area A is such a portion that substantially parallel electric lines of force from the pressing electrode 4 reach the display electrode 2. In the case where the particles have positive electric charges, an electric field distribution in the area A determined by the electric field created by the particles and the electric field given by the pressing electrode 4 is as shown in FIG. 3(*a*) or 3(*b*). Referring to FIGS. 3(*a*) and 3(*b*), the electric field created by electric charges possessed by the particles (black circles in FIGS. 3(*a*) and 3(*b*)) and the electric field by the pressing electrode 4 are combined.

FIG. 3(*a*) shows that the particle is pressed against the display electrode 2 by the electric field given by the pressing electrode 4 and at the same time, a force indicated by an arrow is created between the particle and another particle. In the case where a particle distribution is nonuniform, around the particle, a local electric field is generated, so that the particles are moved in an in-plane area by the electric field given by the pressing electrode 4. After completion of relaxation, as shown in FIG. 3(*b*), the pressed particles are stabilized with a substantially uniform spacing therebetween. This means that the mutual pressing force between the particles is equal to each other. The pressing force is β indicated by an arrow shown in FIG. 2. In other words, the area A in which the particles are disposed with the uniform spacing generates the force β which is extended toward the outside.

On the other hand, in the neighborhood of the collection electrode 1, the particles having electric charges are dense, so that they are repulsed by each other at a certain force. Further, a force is generated also by a potential difference between the display electrode 2 and the collection electrode 1. A combined force of these two forces is a indicated by an arrow shown in FIG. 2. The force a is balanced with the force β described above, so that the particle distribution on the display electrode 2 can be retained in a very stable state. In other words, the spacing between the particles on the display electrode 2 can be set stably by the potentials of the respective electrodes, so that it is possible to realize gradation display with a very good accuracy.

More specifically, by providing such a step that when predetermined voltages are applied to a collection electrode 1 and a display electrode 2, respectively, to move particles between the collection electrode 1 and the display electrode 2, a voltage is applied to a pressing electrode 4 to press the particles against the display electrode 2 so that they are stabilized on the display electrode 2 with a uniform spacing therebetween, it is possible to stably hold the particles on the display electrode 2 to realize stable gradation display.

Further, the lowering in particle movement speed at the weak electric field portion is prevented, so that it becomes possible to effect high-speed display.

As a voltage condition in the above case, it is necessary to exert a pressing force by the pressing electrode 4 in the display electrode 2 direction and the collection electrode 1 direction. More specifically, in the case of the positively charged particles, (potential of pressing electrode 4)>(potential of display electrode 2) and (potential of pressing electrode 4)>(potential of collection electrode 1) are required. In the case of the negatively charged particles, (potential of pressing electrode 4)<(potential of display electrode 2) and (potential of pressing electrode 4)<(potential of collection electrode 1) are required.

Figure 5:
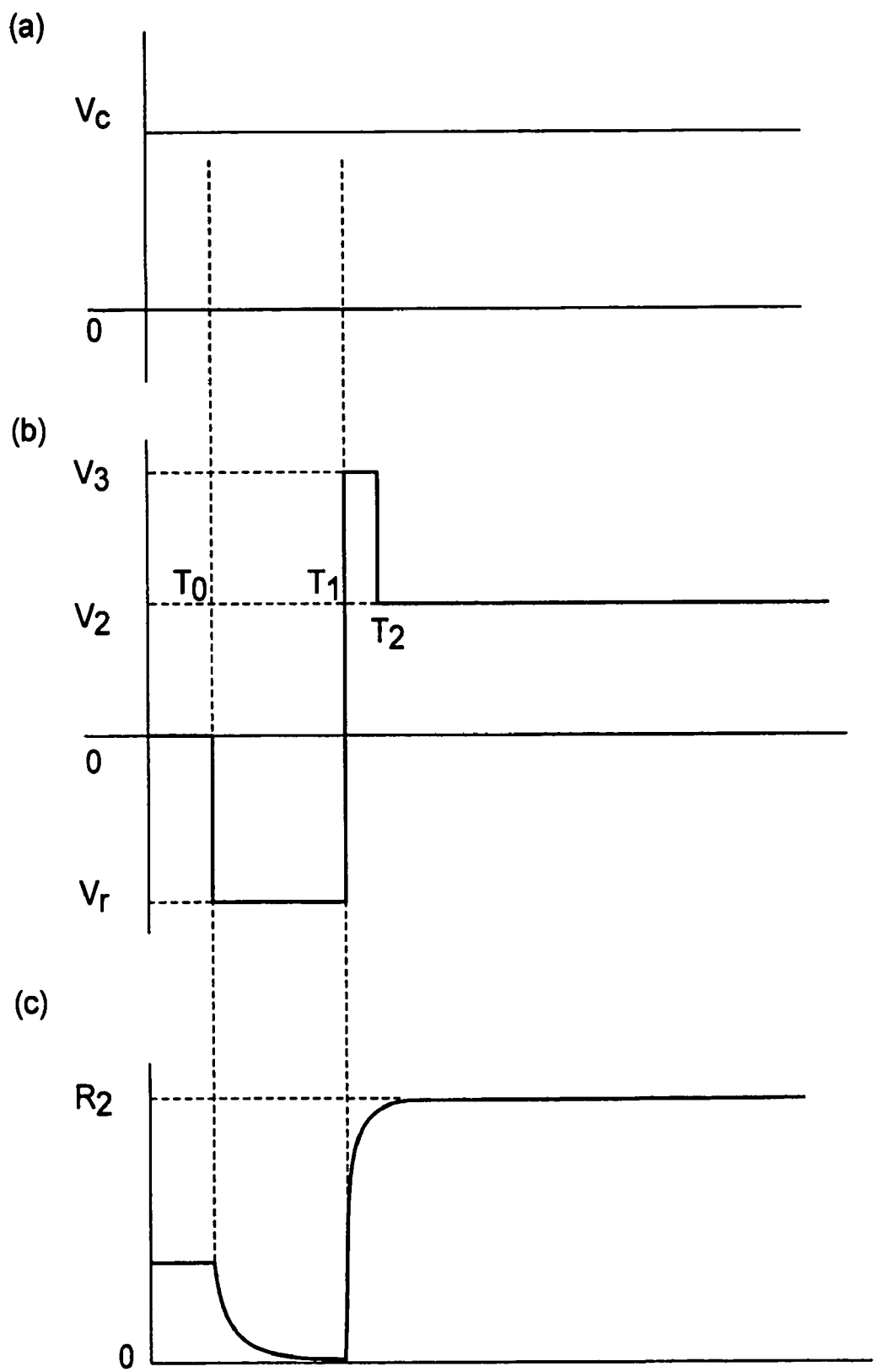
FIGS. 5(a) to 5(c) are waveform diagrams for illustrating a driving method according to the present invention.
Figure 6:
FIGS. 6(a) to 6(c) are sectional views for illustrating particle movement from black reset by the driving method of the present invention.
Figure 6:
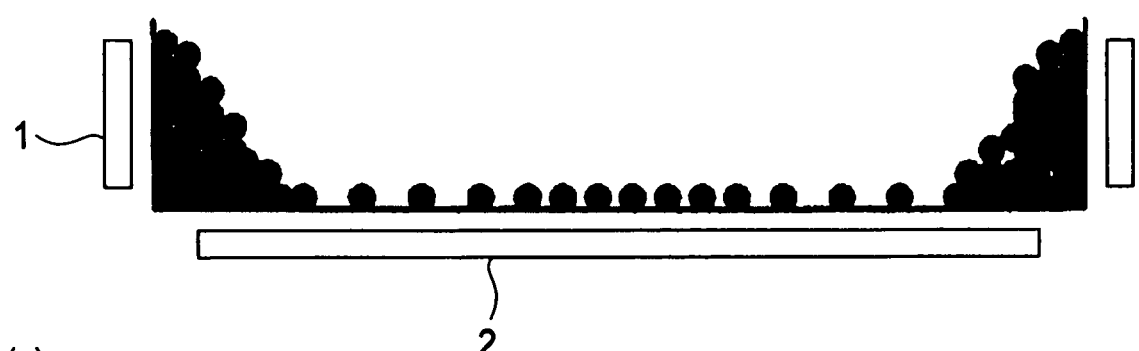
Figure 6:
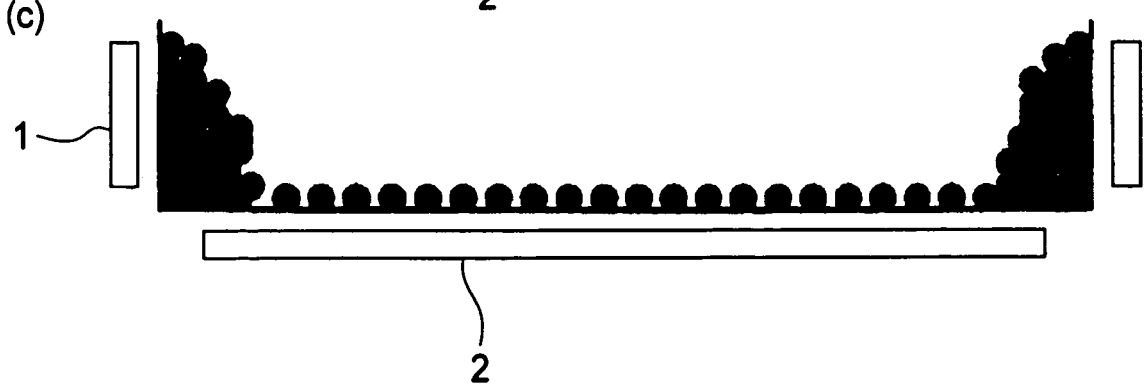

Next, with reference to FIGS. 4-6, a driving method of the horizontal movement-type display apparatus of this embodiment will be described.

As described above, the particles are pressed against the display electrode 2 by the electric field generated by voltage application to the pressing electrode 4 to realize stable gradation, thus permitting higher-speed display. As a point for permitting further high-speed display, a relaxation time of the mutual force of the particles shown in FIG. 3 in a balanced state is considered. The relaxation time is a time for transfer a nonuniform state of the particle distribution to a uniform distribution thereof. The force exerted on the particles is generated by the local electric field distribution due to the nonuniform particle distribution but is smaller than that of a direct drift effect by the electric field, and the force is exerted between adjacent particles to move the particles in such a manner that the force is derived and gradually stabilized. For this reason, even when the force a shown in FIG. 2 is substantially determined by potential setting of the respective electrodes, the force β to be balanced with the force a takes a time for stabilization. This is because an amount of particles necessary for a particle density generating the force β is not determined in a drive initial stage at a position most distant from the collection electrode 1, i.e., in the neighborhood of the cell center.

Figure 4:
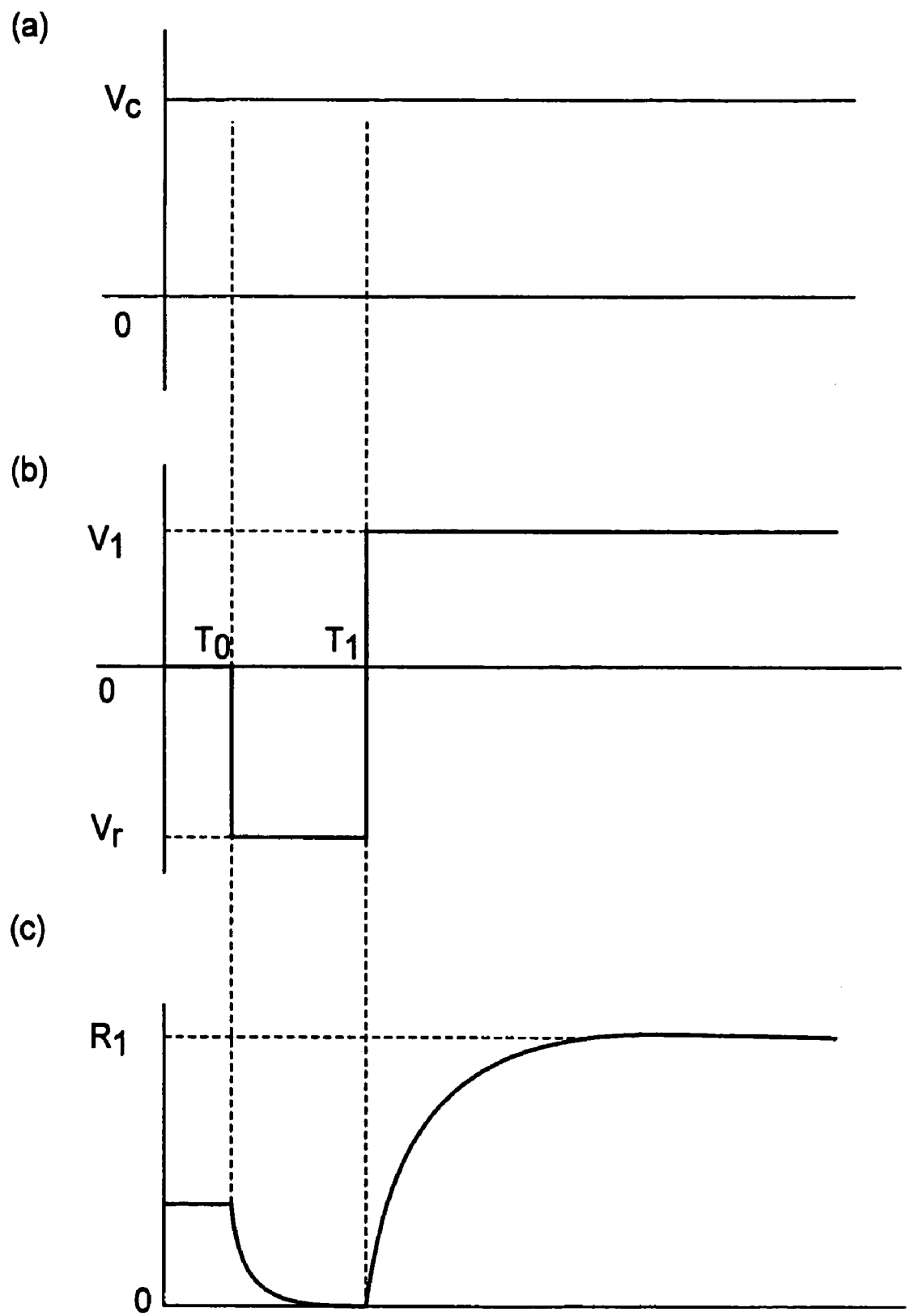
FIGS. 4(a) to 4(c) are waveform diagrams for illustrating display from black reset by a conventional driving method.

Incidentally, FIGS. 4(*a*) to 4(*c*) show an applied voltage to the pressing electrode 4, an example of drive waveform, and a reflected light intensity. More specifically, in the waveform shown in FIG. 4(*b*), an ordinate represents a potential of the display electrode 2 with respect to the collection electrode 1, and an abscissa represents a time. In the waveform shown in FIG. 4(*c*), an ordinate represents the reflected light intensity. When the particles are positively charged, an applied voltage Vc applied to the pressing electrode 4 shown in FIG. 4(*a*) is higher than the potentials of the display electrode 2 and the collection electrode 1, as described above. To the pressing electrode 4, during the drive, a certain DC voltage Vc is applied. The display drive is started at a time t=T0, and a voltage Vr is applied until t=T1 to effect reset drive, i.e., movement of all the particles onto the display electrode 2 so as to lower the reflected light intensity to substantially zero. At the time t=T1 or later, a voltage V1 for displaying a designated gradation level is applied to move a part of the particles to the collection electrode 1. The above operations are drive in the case where the reset operation into black is performed.

Incidentally, as the reset operation, the above described black reset and white reset such that all the particles are moved onto the collection electrode 1 although it is not shown in FIGS. 4(a) to 4(c).

When the display operation is performed as shown in FIGS. 4(a) to 4(c), as is understood from the waveform of FIG. 4(b), a relaxation time thereof is long due to the above described reason. As a result, it takes a time of several hundred microseconds in some cases until the particle distribution is uniform and the reflection light intensity is settled to R1 determined by the voltage V1.

In this embodiment, first, in the initial stage, the force β is determined by setting the particle density in the neighborhood of the pixel center most distant from the collection electrode 1 to a predetermined density suitable for the set gradation level, and then the force a is made equal to the force β by appropriately adjusting the electric field in the neighborhood of the collection electrode 1, thus realizing high-speed display.

One of methods for realizing the high-speed display is shown in FIGS. 5(a) to 5(c), wherein a voltage Vc applied to the pressing electrode 4 is shown in FIG. 5(a), a drive waveform is shown in FIG. 5(b), and an optical response is shown in FIG. 5(c). First, as a first signal, from a time t=T1 to a time t=T2, a voltage V3 for setting a particle amount at a pixel central portion is applied and then a second signal is supplied to return the voltage V3 to a voltage V2 for displaying an actual gradation level at the time t=T2 or later. During these times, a certain voltage Vc is applied to the pressing electrode 4. As described above, (in the case where the particles are positively charged), the voltage Vc is set to be higher than the voltages V2 and V3.

In this case, movement of the particles is shown in FIGS. 6(a) to 6(c). At the pixel, in addition to the collection electrode 1 and the display electrode 2, the pressing electrode 4 (not shown) is disposed at an upper portion of the cell. During the drive, a certain voltage Vc is applied to exert always a pressing force on the particles.

First, by the reset operation, the particles are placed in a state shown in FIG. 6(a) (T0 to T1). In this case, the display electrode 2 is completely covered with the particles, so that a reflected light intensity is zero. Next, when the voltage V3 is applied, as shown in FIG. 6(b), the particles are instantly moved (T1 to T2). In this case, it is possible to set a particle density, necessary for gradation level to be displayed, in the neighborhood of the pixel center by appropriately setting a time width and a voltage to predetermined values in advance. Then, the voltage is lowered to V2 at the time t=T2 or later, so that a peripheral gradation level is stabilized. As a result, as shown in FIG. 6(c), a spacing between the particles is uniform, so that stable display is realized. This driving method can reduce a gradation display time to 1/10 of that in the case where this driving method is not adopted.

More specifically, it is possible to effect high-speed display by providing such a step that a first signal for setting a gradation level at a portion on the display electrode 2 most distant from the collection electrode 1 is supplied to the collection electrode 1 and then a second signal for setting a gradation level in the neighborhood of the collection electrode 1 is supplied to the collection electrode 1 when the particles are moved between the collection electrode 1 and the display electrode 2 by applying a predetermined voltage to the collection electrode 1 and applying a predetermined voltage to the display electrode 2.

Figure 7:
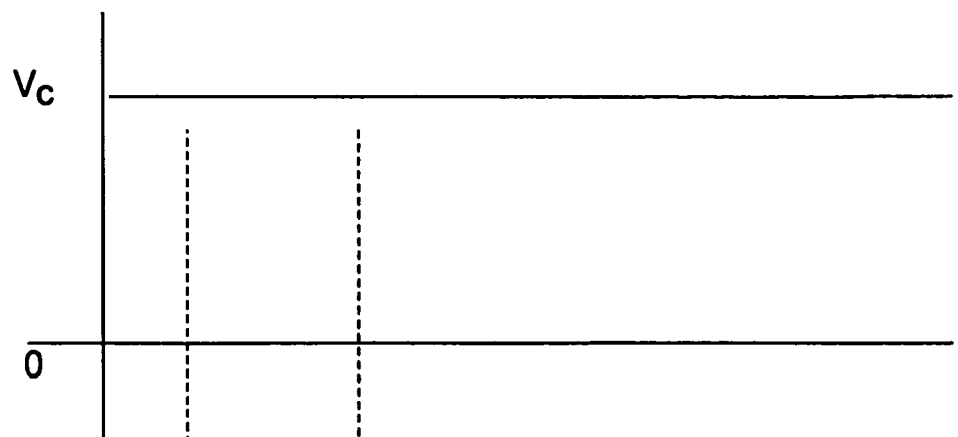
FIGS. 7(a) to 7(c) are waveform diagrams for illustrating display from white reset by the conventional driving method.
Figure 7:
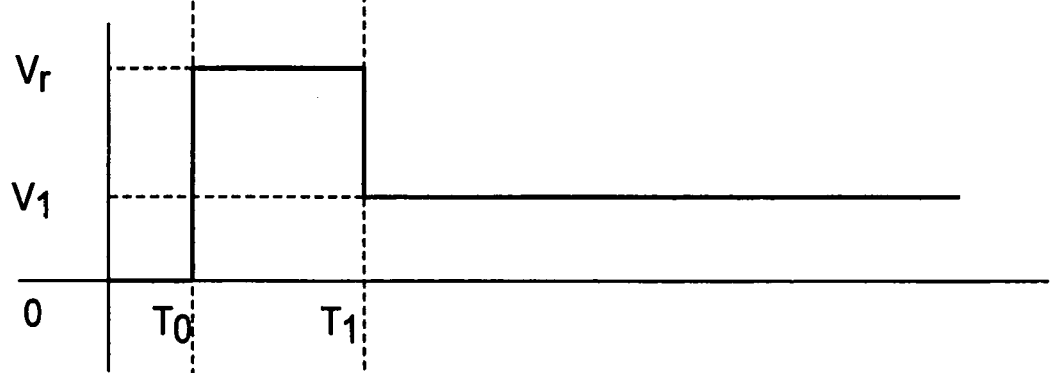
Figure 7:
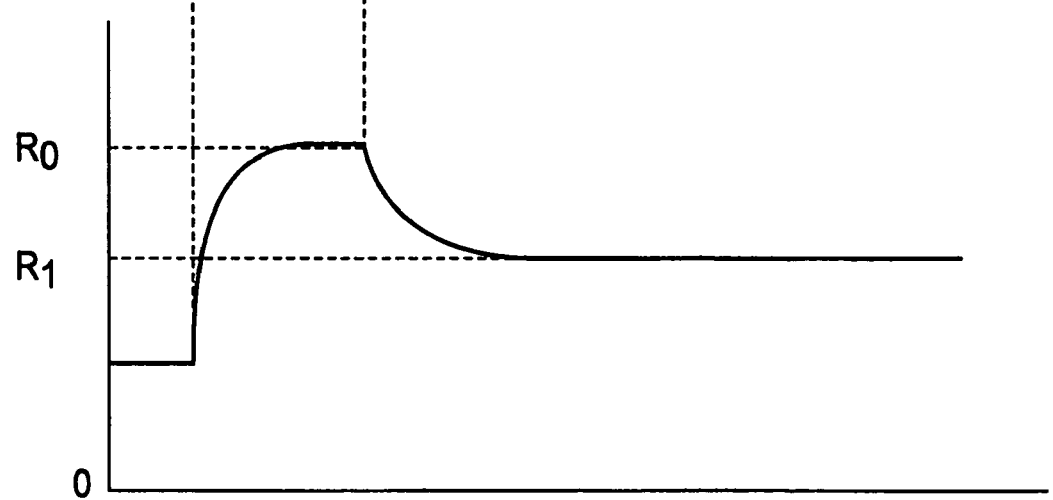
Figure 8:
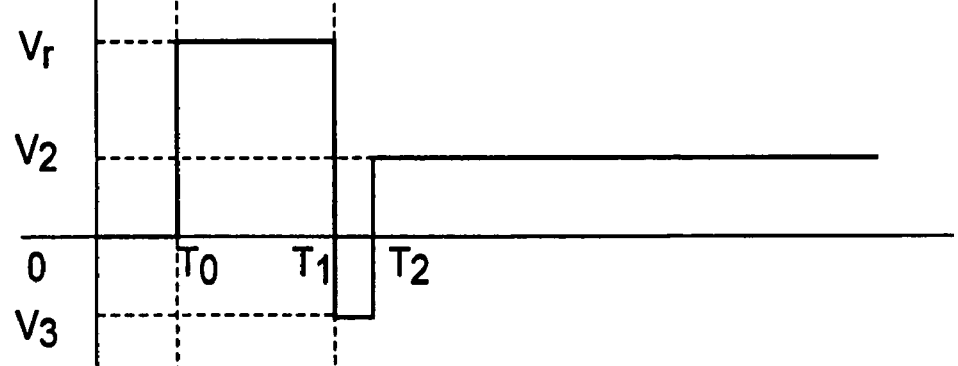
FIGS. 8(a) to 8(c) and FIGS. 9(a) to 9(c) are waveform views for illustrating the driving method of the present invention.
Figure 8:
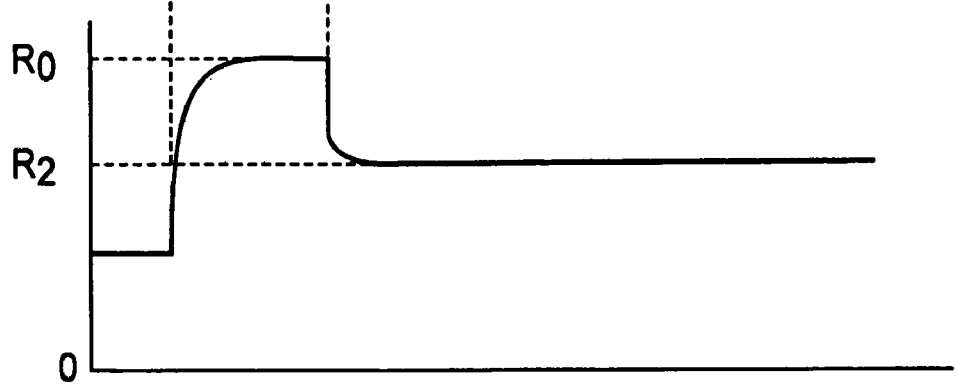
Figure 9:
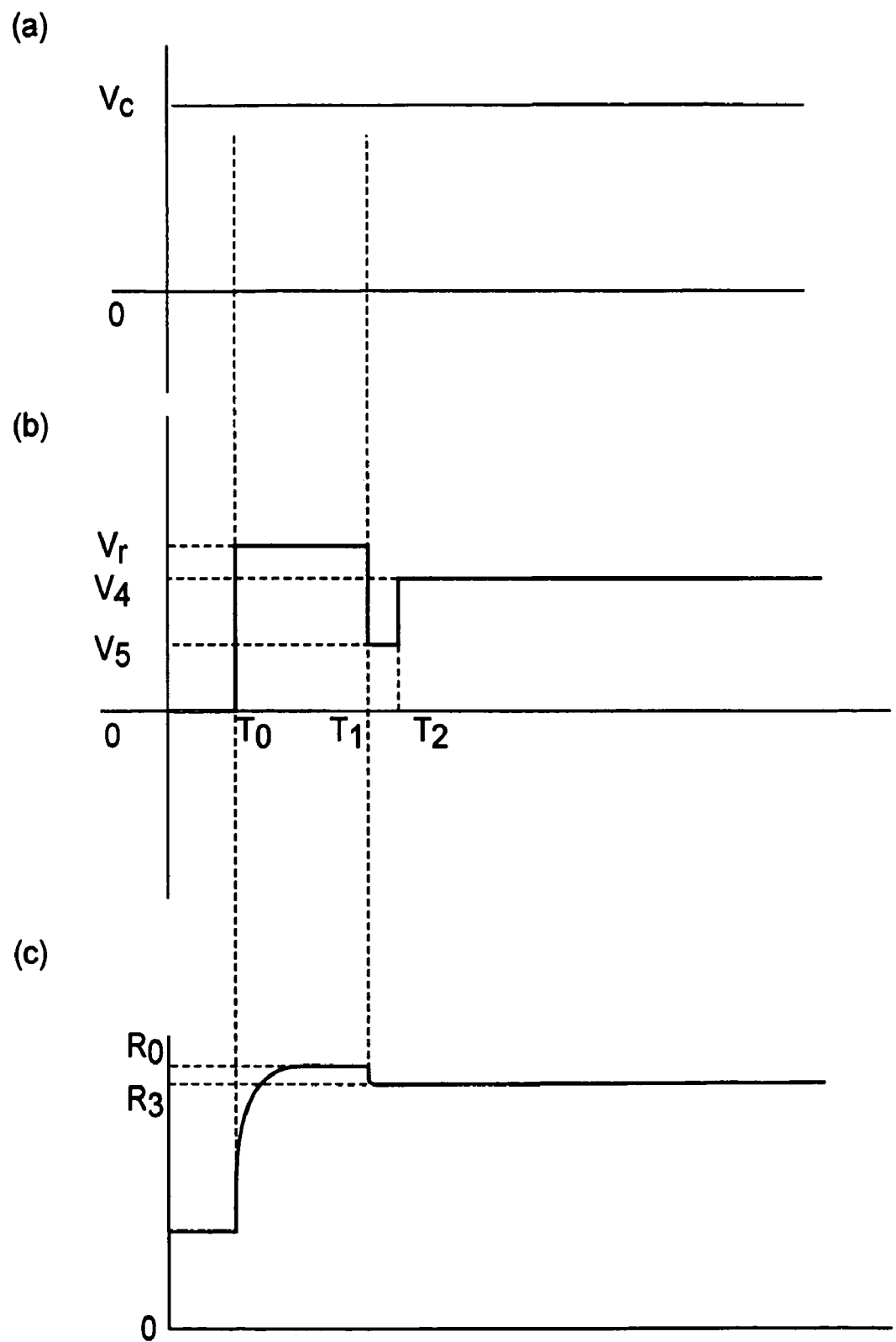

Next, different from the gradation writing from the above described black reset, gradation writing from white reset will be described with reference to FIGS. 7 to 9.

FIGS. 7(a) to (c) correspond to FIGS. 4(a) to (c), wherein the reset direction is changed to a white reset state.

First, as shown in FIG. 7(b), a potential of the display electrode 2 with respect to the collection electrode 1 is set to Vr at times from T0 to T1, whereby all the particles in the cell are moved to the collection electrode 1. As a result, there is no particles on the display electrode 2, so that a reflected light intensity is maximum (R0) as shown in a waveform of FIG. 7(c). Thereafter, the voltage is set to V1 corresponding to a set gradation level R1 at the time t=T1 or later, whereby relaxation is caused by the same effect as in the case described with reference to FIGS. 4(a) to 4(c). As a result, the gradation level is settled at a certain gradation level after lapse of a predetermined time. The time is several hundred mill seconds in some cases. Incidentally, during this drive, a certain voltage Vc is applied to the pressing electrode 4 to always press the particles against the display electrode 2. More specifically, a DC voltage which is higher than the collection electrode 1 and the display electrode 2 is applied to the pressing electrode 4.

Even in the gradation display from the white reset, it is possible to effect high-speed and stable gradation display by driving the display apparatus according to the above described driving method.

Figure 10:
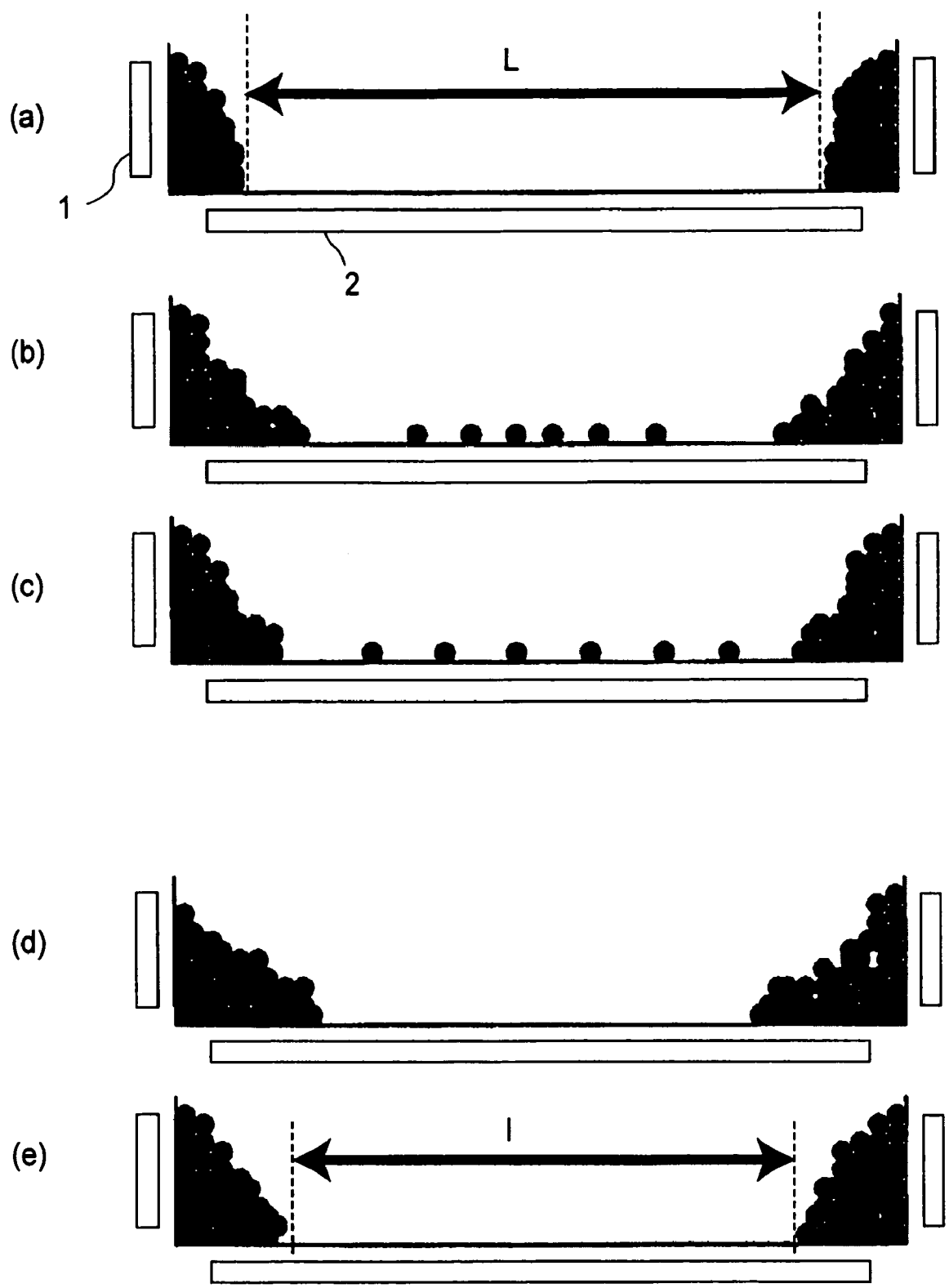
FIGS. 10(a) to 10(e) are sectional views for illustrating particle movement from white reset by the driving method of the present invention.

More specifically, by using a drive waveform as shown in FIG. 8(b), in the pixel, states as shown in FIGS. 10(a) to 10(c) are created. First, by a white reset operation (T0 to T1), as shown in FIG. 10(a), all the particles are moved to the collection electrode 1 to create such a state that there is no particles on the display electrode 2, i.e., a white state. Next, as shown in FIG. 10(b), particles in an amount necessary for display of the set gradation level are distributed (moved) by applying a voltage V3 as a first signal (T1 to T2). Thereafter (T2 or later), as a second signal, a voltage V2 for displaying the set gradation level is applied.

As a result, as shown in FIG. 10(c), an equidistant particle arrangement is realized, so that stable gradation is attained. This driving method can also reduce a gradation display time to 1/10 of that in the case where this driving method is not adopted, similarly as in the case of the driving method shown in FIGS. 5(a) to 5(c).

More specifically, it is possible to effect high-speed display by providing such a step that a first signal for moving an amount of particles necessary for the predetermined display from the collection electrode 1 to the display electrode 2 is supplied to the collection electrode 1 and then a second signal for effecting the predetermined display is supplied to the collection electrode 1 when the particles are moved between the collection electrode 1 and the display electrode 2 by applying a predetermined voltage to the collection electrode 1 and applying a predetermined voltage to the display electrode 2.

Further, in the case where a gradation level close to white by the above described driving method through the white reset, a display mechanism is different in some cases. More specifically, as shown in FIGS. 10(d) and 10(e), it is also possible to realize gradation display by a change in aperture ratio.

This gradation display will be described with reference to FIGS. 9(a) to 9(c). As shown in FIG. 9(b), an applied voltage is changed from Vr to V5, whereby, as shown in FIG. 10(d), some of particles in the neighborhood of the collection electrode 1 are moved but are not released (moved) in the cell center direction in the case of a small difference in voltage between Vr and V5. Next, the applied voltage is returned to V4, whereby the moved particles in the neighborhood of the collection electrode 1 are returned toward the collection electrode 1. However, the applied voltage is not returned to Vr, so that the resultant particle distribution state is shifted inward compared with the white reset state (FIG. 10(a)). As a result, it is possible to display a gradation level R2 close to white.

More specifically, an aperture (length) of L at the time of resetting is decreased to I. Incidentally, similarly as in the above described driving method, at the upper portion of the cell, a pressing electrode 4 (not shown) is disposed and a predetermined constant voltage Vc is applied to the pressing electrode 4 to always exert the pressing force on the particles.

In the case of such a gradation display, it is possible to effect display by directly changing the white reset voltage Vr to the gradation voltage V4. In this case, however, gradation stability is poor. This is because when the white reset voltage (Vr) is set to a larger value than is necessary so as to ensure a reliable reset operation, the particles at the time of white resetting are strongly pressed against the collection electrode 1, thus failing to result in a smooth shift of particle distribution shape to that at the time of gradation display. More specifically, when the applied voltage is directly changed to V4, the resultant particle distribution includes a component of partial particle breakage from the collection electrode 1, so that it is difficult to ensure a stable value of I.

On the other hand, as in this embodiment, first of all the voltage V5 is applied as the first signal to largely break (more) the particles and then such a step that the broken particles are uniformly collected is performed. As a result, it becomes possible to stabilize the value of I. Accordingly, in such a mechanism, it is possible to effect high-speed display by providing such a step that a first signal for moving an amount of particles necessary for the predetermined display from on the collection electrode 1 or in the neighborhood of the collection electrode 1 toward the display electrode 2 to change a particle distribution is supplied and then a second signal for effecting the predetermined display is supplied when the particles are moved between the collection electrode 1 and the display electrode 2 by applying a predetermined voltage to the collection electrode 1 and applying a predetermined voltage to the display electrode 2. Accordingly, it is found that the above described driving method is effective.

As described above, it is possible to realize high-speed and stable gradation display by pressing the particles against the display electrode and in addition thereto, by using the above described driving method, it is possible to effect high-speed display from the black reset. Further, the similar effect is also achieved with respect to the display from the white reset. The present invention is also effective with respect to such a different mechanism that the gradation level close to white is displayed.

In the above description, the case where the first signal for moving the particles in an amount necessary for the predetermined display from the collection electrode 1 to the display electrode 2 and the second signal for effecting the predetermined display are supplied to the collection electrode 1 but these first and second signals may also be supplied to the display electrode 2.

INDUSTRIAL APPLICABILITY

As described hereinabove, according to the present invention, it is possible to provide a particle movement-type display apparatus capable of stably realizing halftone (gradation) display at high speed. Further, it is also possible to provide a method of driving the particle movement-type display apparatus.

While the invention has been described with reference to the structures disclosed herein, it is not confined to the details set forth and this application is intended to cover such modifications or changes as may come within the purpose of the improvements or the scope of the following claims.

The invention claimed is:

1. A particle movement-type display apparatus, comprising:
    a plurality of pixels each comprising a first electrode, a second electrode, a third electrode, a partition wall, and a dispersion liquid for dispersing a plurality of particles to effect display,
    wherein the first electrode is disposed as part of the partition wall, the third electrode is disposed opposite to the second electrode, the partition wall extends from the second electrode to the third electrode so as to separate adjacent pixels, and the dispersion liquid is sealed in a closed space defined by the first electrode, the second electrode and the third electrode, and
    wherein, when predetermined voltages are applied to the first electrode and the second electrode so that the particles are gradually moved towards one of the first electrode and the second electrode, another voltage for generating an electric field is applied to the third electrode so as to press the particles against the first and second electrodes to effect a predetermined gradation level of display proportional to the predetermined voltages applied to the first electrode and the second electrode.

2. A method of driving a particle movement-type display apparatus, comprising:
    providing a particle movement-type display apparatus including a plurality of pixels each comprising a first electrode, a second electrode, a third electrode, a partition wall, and a dispersion liquid for dispersing a plurality of particles to effect display, wherein the first electrode is disposed as part of the partition wall, the third electrode is disposed opposite to the second electrode, the partition wall extends from the second electrode to the third electrode so as to separate adjacent pixels, and the dispersion liquid is sealed in a closed space defined by the first electrode, the second electrode and the third electrode; and
    applying predetermined voltages to the first electrode and the second electrode so that the particles are gradually moved towards one of the first electrode and second electrode, while applying another voltage to the third electrode for generating an electric field so as to press the particles against the first and second electrodes to effect a predetermined gradation level of display proportional to the predetermined voltages applied to the first electrode and the second electrode.

3. A method according to claim 2, wherein the method further comprises a step of supplying, to either one of the first electrode and second electrode, a first signal for setting a gradation level at a portion on the second electrode most distant from the first electrode and then supplying a second signal for setting a gradation level at a portion in the neighborhood of the first electrode when the particles are moved between the first and second electrodes by applying predetermined voltages to the first and second electrodes respectively, while applying a voltage to the third electrode.

4. A method according to claim 2, wherein the method further comprises a step of supplying, to either one of the first electrode and second electrode, a first signal for moving an amount of particles necessary for the predetermined display from the first electrode to the second electrode and then supplying a second signal for effecting the predetermined display when the particles are moved between the first and second electrodes by applying predetermined voltages to the first and second electrodes, respectively, while applying a voltage to the third electrode.

5. A method according to claim 2, wherein the method further comprises a step of supplying, to either one of the first electrode and second electrode, a first signal for moving an amount of particles necessary for the predetermined display from on the first electrode or a portion in the neighborhood of the first electrode toward the second electrode to change a particle distribution and then supplying a second signal for effecting the predetermined display when the particles are moved between the first and second electrodes by applying predetermined voltages to the first and second electrodes respectively, while applying a voltage to the third electrode.

6. A method according to claim 2, wherein the particles are positively chargeable particles, and the third electrode has a potential which is higher than those of the second electrode and the first electrode.

7. A method according to claim 2, wherein the particles are negatively chargeable particles, and the third electrode has a potential which is lower than those of the second electrode and the first electrode.

* * * * *